United States Patent [19]

Sainsbury, Jr.

[11] 4,288,057
[45] Sep. 8, 1981

[54] CURTAIN AND WINDOW SHADE HARDWARE

[76] Inventor: Arthur W. Sainsbury, Jr., 103 Pine St., South Easton, Mass. 02375

[21] Appl. No.: 90,549

[22] Filed: Nov. 2, 1979

[51] Int. Cl.³ .............................................. F16M 13/00
[52] U.S. Cl. ..................................... 248/546; 248/262
[58] Field of Search ............... 248/254, 252, 256, 257, 248/261, 262, 263, 264, 265, 266, 268, 267, 546, 547, DIG. 9, 216.1, 217.3; 52/98; 85/28

[56] References Cited

U.S. PATENT DOCUMENTS

| | | | |
|---|---|---|---|
| 721,833 | 3/1903 | Reimann | 248/268 |
| 975,235 | 11/1910 | Hansen | 85/28 |
| 2,131,399 | 9/1938 | Jenkins | 248/267 |
| 2,693,927 | 11/1954 | Gardner | 248/262 X |
| 3,599,686 | 8/1971 | Peebles | 248/547 X |

FOREIGN PATENT DOCUMENTS

| | | | |
|---|---|---|---|
| 250037 | 8/1947 | Switzerland | 248/262 |
| 819357 | 9/1959 | United Kingdom | 248/DIG. 9 |

*Primary Examiner*—J. Franklin Foss

[57] ABSTRACT

Curtain or window shade hardware having a break-away tab handle for holding the hardware while it is being fastened to a window frame, door frame, wall or similar element of a building structure. The hardware may have integral prongs extending therefrom as fastening means and may have a hammer strike pad to provide a safe striking surface.

1 Claim, 11 Drawing Figures

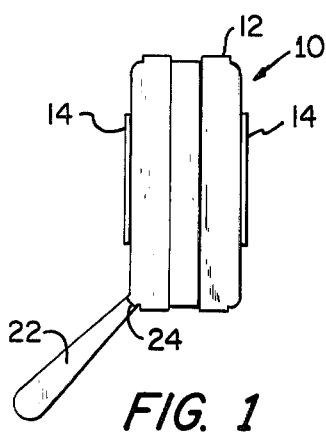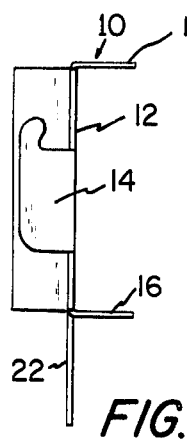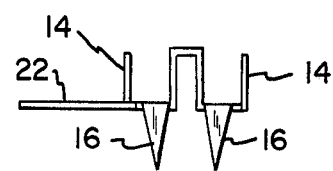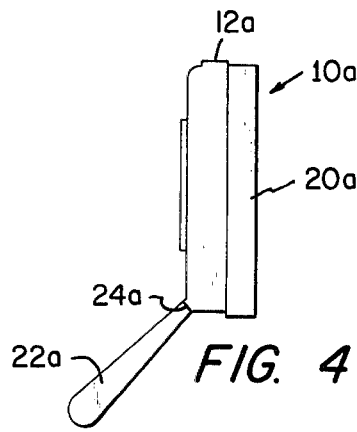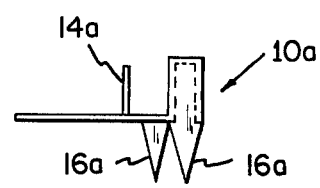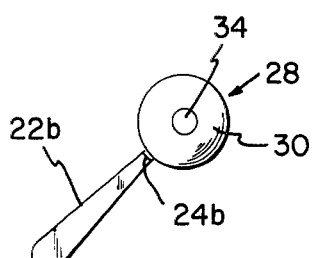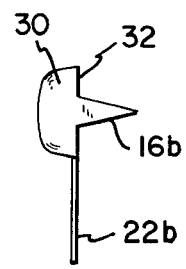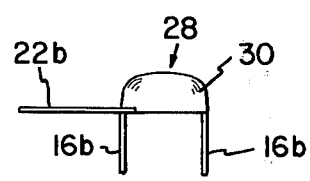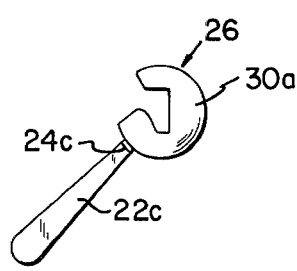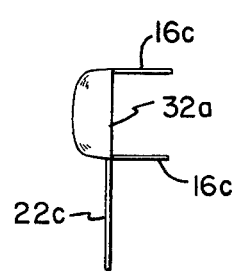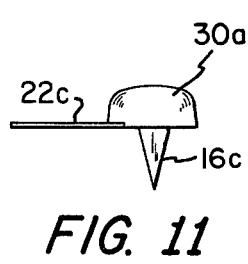

CURTAIN AND WINDOW SHADE HARDWARE

BACKGROUND OF THE INVENTION

This invention relates generally to curtain or window shade hardware and more specifically to a curtain rod bracket or hanger for supporting curtain rods, drapery rods and the like on window frames, door frames, walls and similar elements of a building structure or to a window shade holder for supporting window shades on window frames of a building structure.

Presently available curtain rod brackets include a base having a hook, prong or collar extending therefrom and adapted to engage the end of a solid or hollow curtain rod and support in relation to a window, for example. The bracket is usually secured to the building by means of nails or screws which are inserted through openings formed in the base. Due to the small size of the bracket and the position of the holes, it is difficult to insert a nail and hold it in position without positioning the fingers where they can be struck by a hammer blow.

SUMMARY OF THE INVENTION

The improved curtain rod bracket according to the present invention is characterized by the fact that a breakaway tab handle extends from the bracket so that the bracket may be held by the tab while the bracket is being nailed to a building structure. The bracket with the breakaway tab may be combined with integral prongs and/or a hammer strike pad.

The improved window shade holder according to the present invention includes a slot member and an aperture member, each of which includes a breakaway tab handle.

BRIEF DESCRIPTION OF THE DRAWINGS

Further details of the invention are explained below with the help of the examples illustrated in the attached drawing in which:

FIG. 1 is a top plan view of a double style curtain rod bracket according to the present invention;

FIG. 2 is a side elevation of the curtain rod bracket shown in FIG. 1;

FIG. 3 is an end elevation of the curtain rod bracket shown in FIG. 1;

FIG. 4 is a top plan view of a single style curtain rod bracket according to the present invention;

FIG. 5 is an end elevation of the curtain rod bracket shown in FIG. 4;

FIG. 6 is a top plan view of an apertured window shade holder according to the present invention;

FIG. 7 is an end elevation of the window shade holder shown in FIG. 6;

FIG. 8 is a side elevation of the window shade holder shown in FIG. 6;

FIG. 9 is a top plan view of a slotted window shade holder according to the present invention;

FIG. 10 is a side elevation of the window shade holder shown in FIG. 9; and

FIG. 11 is an end view of the window shade holder shown in FIG. 9.

DESCRIPTION OF THE PREFERRED EMBODIMENTS

There is shown in the drawing in FIGS. 1-3 curtain hardware and more specifically, a curtain rod bracket 10 formed from a metal such as sheet steel and which may be fabricated by a stamping operation. The bracket 10 comprises a base 12 which is generally rectangular in configuration and which has a flat, curtain rod hook 14 extending from each long side edge in right angle relation to the horizontal plane of the base 12. A pair of spaced prongs 16 are integral with and extend from each short edge of the base 12 in the opposite direction of the hooks 14. Each of the prongs 16 has a tapered, free terminal end which is adapted to penetrate wooden window trim and is in right angle relation to the horizontal plane of the base 12. A rectangular hammer strike pad 18 is integral with and extends upwardly from the base 12. The strike pad 18 is positioned between and spaced from the curtain rod hooks 14 and includes an upper surface 20 which lies on a horizontal plane positioned above the free edges of the curtain rod hooks 14. The strike pad 18 in the embodiment disclosed in FIGS. 1-3 has a hollow interior open at the edge on the same horizontal plane as the base 12. If desired, the strike pad could be a solid bar extending upwardly from the base 12 in the same position as the strike pad 18. The strike pad 18 extends from one short edge of the base 12 to the other. A breakaway tab handle 22 extends from a corner of the base 12 on the same horizontal plane as the base 12 between a curtain rod hook 14 and a prong 16. The tab handle 22 is generally rectangular in configuration although its free terminal end may be rounded in plan view as shown in FIG. 1. The tab handle 22 is weakened on a transverse breakaway line 24 in close proximity to the juncture with the base 12. A groove, a series of in-line spaced apertures or other well known means may be utilized to provide the breakaway line 24.

The improved curtain rod bracket 10 is used in pairs, one bracket on each side of a window. The curtain rod bracket 10 is held by the operator in his left hand by grasping the tab handle 22 and then positioned on a wooden window casing. The right hand utilizes a hammer and by hitting the strike pad 18 drives the prongs 16 into the window casing. With the bracket 10 fixed in position, the tab handle 22 is bent up and down along the weakened line 24 breaking the tab handle 22 from the base 12. Another bracket 10 is positioned and nailed on the window casing on the opposite side from the first bracket 10 and in the same manner as the first bracket 10. A pair of curtain rods may then be engaged to the curtain rod hooks 14 in a manner well known in the art.

A variation of the bracket 10 is shown in the drawings at FIGS. 4 and 5, numbered 10a. The curtain rod bracket 10a is formed of similar materials and in a similar manner to that of the bracket 10. The bracket 10a comprises a generally rectangular base 12a which has a flat, curtain rod hook 14a extending from a long side edge in right angle relation to the horizontal plane of the base 12a. A prong 16a extends from each short edge of the base 12a in the opposite direction from that toward which the curtain rod hook 14a extends. The prongs 16a have the same configuration and function as the prongs 16. A rectangular hammer strike pad 18a extends upwardly from the base 12a and spaced from the curtain rod hook 14a. The strike pad 18a has the same configuration and construction as the strike pad 18, has its upper surface 20a located on a plane above the free edge of the hook 14a and extends from one short edge of the base 12a to the other. A breakaway tab handle 22a extends from a corner of the base 12a on the same horizontal plane as the base 12a. The tab handle 22a is weakened on a line 24a which is positioned and formed in the same manner as the line 24 of the tab handle 22.

The variation 10a of the bracket 10 is also used in pairs in the same manner as the bracket 10 and the tab handle 22a, after being utilized in the same way as the tab handle 22, is broken off and discarded. A pair of the bracket variations 10a are adapted to be engaged to a window casing in the usual manner to hold a single curtain rod.

There is shown in FIGS. 6–11 window shade hardware and more specifically a pair of window shade holders comprising a slot member 26 and an aperture 28. The aperture member 28 comprises a cup-like base portion 30 having a peripheral edge 32 from which a pair of prongs 16b extend. The prongs 16b are positioned on opposite sides of the base portion 30 and each of them has a tapered, free terminal end which is adapted to penetrate wooden window trim or frames. A through hole 34 is formed in the base portion 30 and has its vertical axis coaxially aligned with the vertical central axis of the base portion 30. A breakaway tab handle 22b is integral with and extends from the peripheral edge 32 on a horizontal plane at right angles to the vertical, central axis of the base portion 30. The tab handle 22b is weakened on a transverse breakaway line 24b which is formed in close proximity to the juncture with the peripheral edge 32. The slot member 26 comprises a cup-like base portion 30a having a peripheral edge 32a from which a pair of prongs 16c extend. The prongs 16c are similar in configuration and in position to the prongs 16b. A breakaway tab handle 22c similar in configuration, function, and location to the tab handle 22b extends from the peripheral edge 32a and includes a transverse breakaway line 24c positioned in close proximity to the juncture with the peripheral edge 32a.

The window shade holders are used in pairs with the aperture member 28 positioned on one side of a window casing and the slot member 26 positioned on the other side of the window casing.

What I claim is:

1. Hardware comprising a one-piece bracket, the bracket including a base, a holding tab, a curtain rod hook, a first prong, a second prong, and a strike pad, the base having a first side edge, lying on a horizontal plane and having an upper surface, the first prong integral with the base and in angular relation to the holding tab and the base, the holding tab extending from the first side edge and lying on the horizontal plane and the first prong in angular relation to the horizontal plane, the strike pad extending from the upper surface of the base in right angle relation to the horizontal plane, the second prong extending from the base toward the same direction as and in spaced parallel relation to the first prong and the curtain rod hook extending from the base in a direction away from the first prong.

* * * * *